United States Patent [19]
Schmidt

[11] Patent Number: 6,070,914
[45] Date of Patent: Jun. 6, 2000

[54] PIPE COUPLING

[75] Inventor: Frank Schmidt, Erlensee, Germany

[73] Assignee: Rasmussen GmbH, Maintal, Germany

[21] Appl. No.: 09/314,453

[22] Filed: May 18, 1999

[30] Foreign Application Priority Data

| May 20, 1998 | [DE] | Germany | 198 22 645 |
| Feb. 25, 1999 | [DE] | Germany | 199 08 119 |

[51] Int. Cl.$^7$ .................................................. F16L 17/02
[52] U.S. Cl. ...................... 285/112; 285/328; 285/373; 285/422; 285/906; 285/910
[58] Field of Search .................................. 285/112, 104, 285/105, 373, 419, 422, 910, 328, 906

[56] References Cited

U.S. PATENT DOCUMENTS

| 2,451,354 | 10/1948 | Ohls | 285/112 |
| 2,508,914 | 5/1950 | Graham | 285/112 |
| 3,664,691 | 5/1972 | Nakamura | 285/112 |
| 4,119,333 | 10/1978 | Straub | 285/112 |
| 4,629,217 | 12/1986 | Straub | 285/112 |
| 5,310,223 | 5/1994 | Straub | 285/112 |

*Primary Examiner*—Dave W. Arola
*Attorney, Agent, or Firm*—Darby & Darby

[57] ABSTRACT

A pipe coupling for connecting pipes having unprofiled end sections includes an elastomeric sealing gasket for holding the unprofiled pipe end sections in a sealed manner. A clamping clip surrounds the sealing gasket. The clamping clip includes a clip strap having a first end and a second end. A first clamping jaw is formed at the first end. A second clamping jaw is formed at the second end. The clamping jaws are drawn together by a tensioning device. The clip strap has radially inwardly directed projecting flanges on each of its axial ends. A first C-shaped clamping ring and a second C-shaped clamping ring are each disposed between the sealing gasket and one of the flanges. Each of the C-shaped clamping rings are supported on a radially inner side of the clip strap. Each of the C-shaped clamping rings have projections projecting from its radially inner face and, when said clip strap is tensioned, the projections of the C-shaped rings engage in the pipe material. The clamping rings are substantially made of plastic and approximately fill the space between the sealing gasket and one of the flanges. The clamping rings may be formed as a single part or from two ring parts. If formed of two parts, the radially inner part may be made of a brass alloy. The projections may be formed as encircling ribs.

18 Claims, 8 Drawing Sheets

PIPE COUPLING

BACKGROUND OF THE INVENTION

1. Field of the Invention

The present invention relates to a pipe coupling for connecting pipes having unprofiled end sections. The pipe coupling includes an elastomeric sealing gasket for holding the pipe end sections in a sealed manner. A clamping clip surrounds the sealing gasket. The clamping clip includes a clip strap, which is split in the circumferential direction, thereby forming an incomplete ring. The ends of the clip strap are bent radially outwardly and back to form clamping jaws, which can be drawn together by a tensioning device (e.g., a tensioning bolt). The clip strap has radially inwardly projecting flanges on each of its axial ends. A first C-shaped clamping ring and a second C-shaped clamping ring are each disposed between the sealing gasket and one of the flanges. Each of the C-shaped clamping rings are supported on the radially inner side of the clip strap. Each of the C-shaped clamping rings have projections projecting from their radially inner face. When the clip strap is tensioned, the projections engage in the pipe material.

2. Discussion of the Related Art

European reference EP 0,205,896 A2 discloses a known pipe coupling that includes a clamping ring having a thin-walled, frustoconical split washer and a holding ring. The inner circumference of the split washer bears against a shoulder formed on the outer circumferential face of the holding ring. The outer circumference of the split washer lies in the bend between one of the flanges and the clip strap. The split washer and the holding ring are each made of metal. The holding ring has rasp-like teeth on its radially inner face, which are forced out of the holding ring material. Thus, the clamping ring according to the European '896 reference is structurally complicated and is expensive to produce.

SUMMARY OF THE INVENTION

It is an object of the present invention to provide a pipe coupling where the clamping rings are easy to produce, but without detracting from the strength of the clamping rings.

According to exemplary embodiments of a pipe coupling according to the present invention, this and other objects are achieved. In accordance with a first solution, the clamping rings are made of, at least in part, plastic. Each clamping ring includes a first ring part and a second ring part. The second ring part is attached to a radially inner circumference of the first ring part. Each of the clamping rings are approximately triangular in cross section so that they approximately fill the space between the sealing gasket and one of the flanges.

According to a second solution, the clamping rings are made substantially of plastic. Each of the clamping rings are approximately triangular in cross section so that they approximately completely fill the space between the sealing gasket and one of the flanges. Each of the clamping rings have projections projecting from its radially inner face. The projections are ribs that extend over the inner circumference of each of the clamping rings. The ribs taper radially inwardly.

In both solutions, the clamping rings can be produced easily and inexpensively. Both clamping rings substantially completely fill the annular spaces, which are usually triangular in cross section, between the sealing gasket and the adjacent flange without requiring additional supporting parts. Therefore, the clamping rings have a relatively large cross-sectional area, with a correspondingly high strength. Thus, the clamping rings support the pipes in the axial direction against high internal pressures and are able to withstand high radial forces when the clip is being tensioned. In addition, the ribs of the second solution withstand high axial forces even though they are substantially made of plastic (as is the second ring part of the first solution).

In the first solution, the projections may be formed by a predetermined, uniform roughness on the radially inner face of the clamping rings. The radially inner face of the clamping rings may, to a considerable extent, bear over a relatively large surface against the outer circumference of the end sections of the pipes. The minute projections on the rough face form very fine grooves in the pipe material when the pipes and the clamping rings are displaced relative to one another due to high internal pressures in the pipes. Thus, the risk of reducing the strength of the pipes, especially for plastic pipes, is very low.

In the first solution, it is further possible for the second ring part to be a friction lining that contains the roughness. This lining may be prefitted to the first ring part (e.g., in a form-fitting or surface-bonded manner). Thus, when the coupling is fitted, only the clamping rings need to be fitted.

The second ring part is preferably attached in a groove in the radially inner circumference of the first ring part. The depth of the groove is less than the radial thickness of the second ring part. The groove, therefore, simultaneously contributes to axially securing the second ring part. Additionally, the attachment between the ring parts can be achieved in a simple manner (e.g., by adhesive bonding).

The roughness may also be produced by using emery. If the emery is embedded directly in the inner faces of the clamping rings, when the coupling is fitted, it is, once again, only necessary to fit the clamping rings.

Alternatively, the projections may be pressed out, from the radial outside inward, in the form of flakes, next to radially continuous incisions in the friction linings. The friction linings, in this alternative embodiment, are preferably made of metal.

In the first solution, it is also possible for the first ring part to be substantially made of plastic. The second ring part is substantially made of metal. The projections are preferably ribs that extend over the inner circumference of the second ring part. The ribs taper radially inwardly. The ribs are made of metal, and, therefore, have a correspondingly high strength so that the pipe connection is able to withstand higher axial loads than when plastic ribs are used.

In this case, the first ring part may be attached in a groove in the radially outer circumference of the second ring part. The depth of the groove is preferably less than the radial thickness of the first ring part. Because the walls of the groove, like the radially inner second ring part, is made of metal, the risk of these walls breaking is less than if the second ring part were formed substantially from plastic.

The plastic used in the present invention is preferably a polyamide that is reinforced with glass fibers so that the material will have a very high strength. The polyamide is preferably PA 66.

The metal used in the present invention is preferably made substantially of brass. Brass is readily formable, but nevertheless has a comparatively high strength. The strength of the metal is increased still further if it also contains manganese.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF PRESENTLY PREFERRED EXEMPLARY EMBODIMENTS

Figure 1:
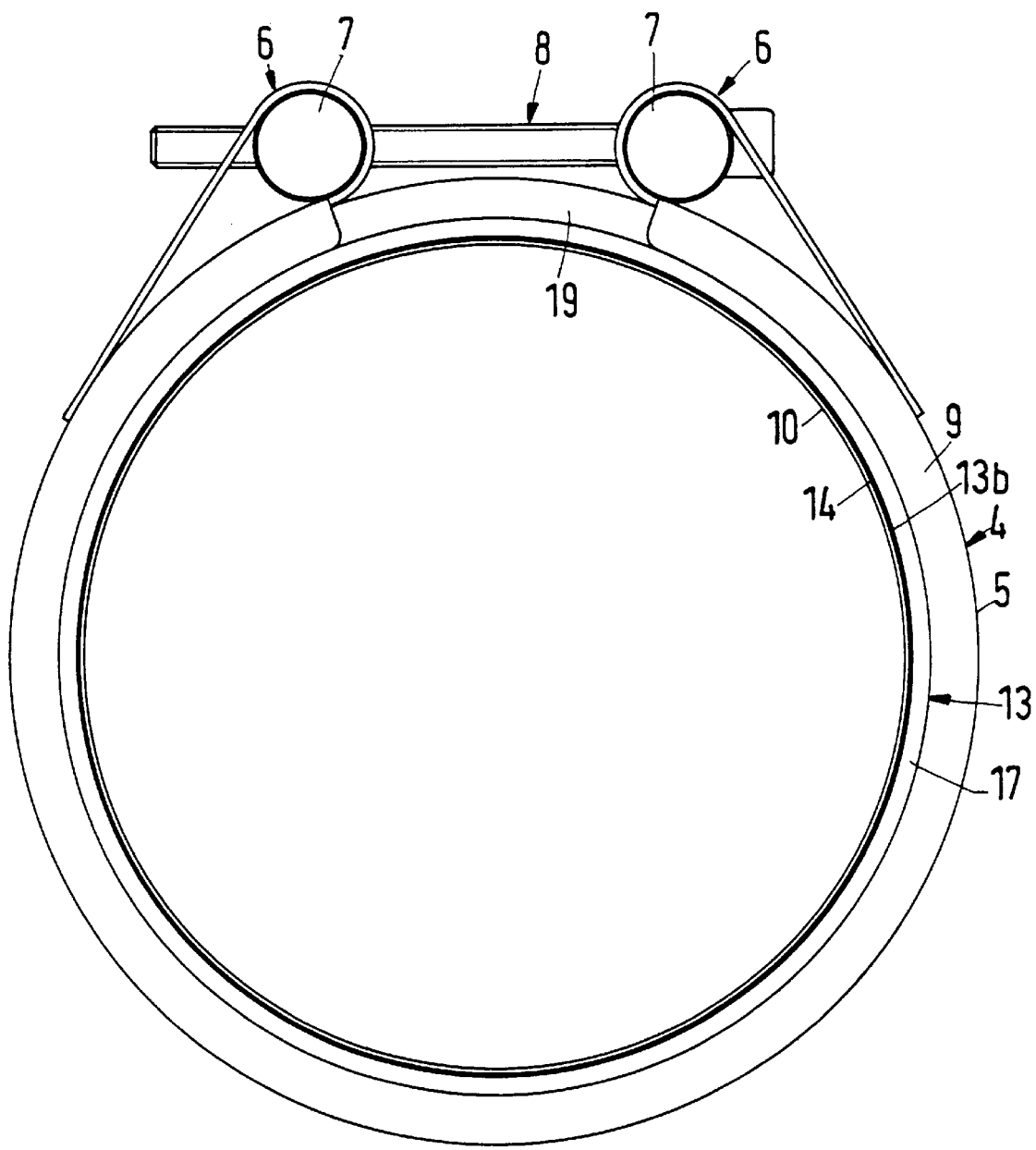
FIG. 1 is an axial end view of a first exemplary embodiment of a pipe coupling according to the present invention.
Figure 2:
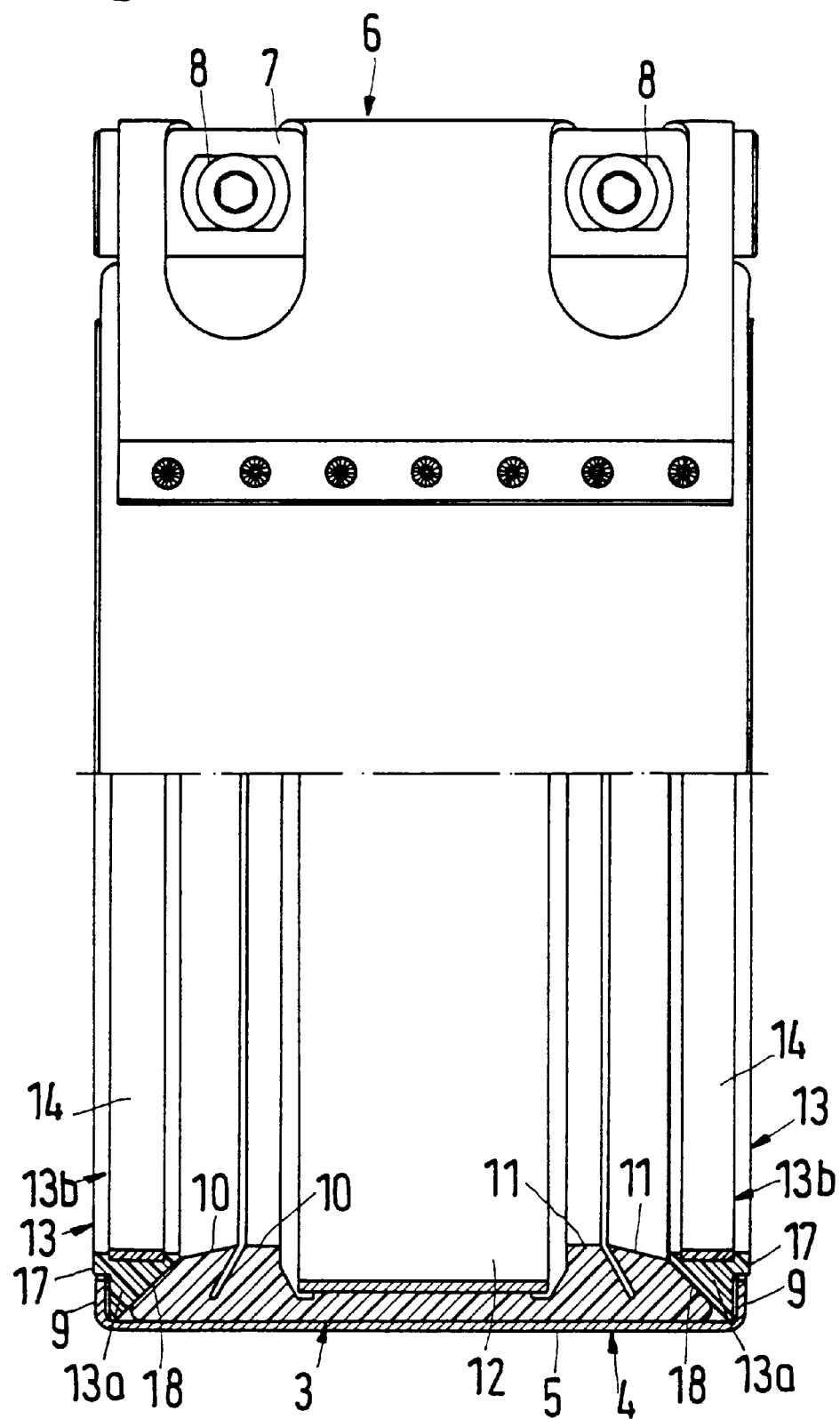
FIG. 2 is a front view, partially shown in cross-section, of the pipe coupling of FIG. 1.
Figure 3:
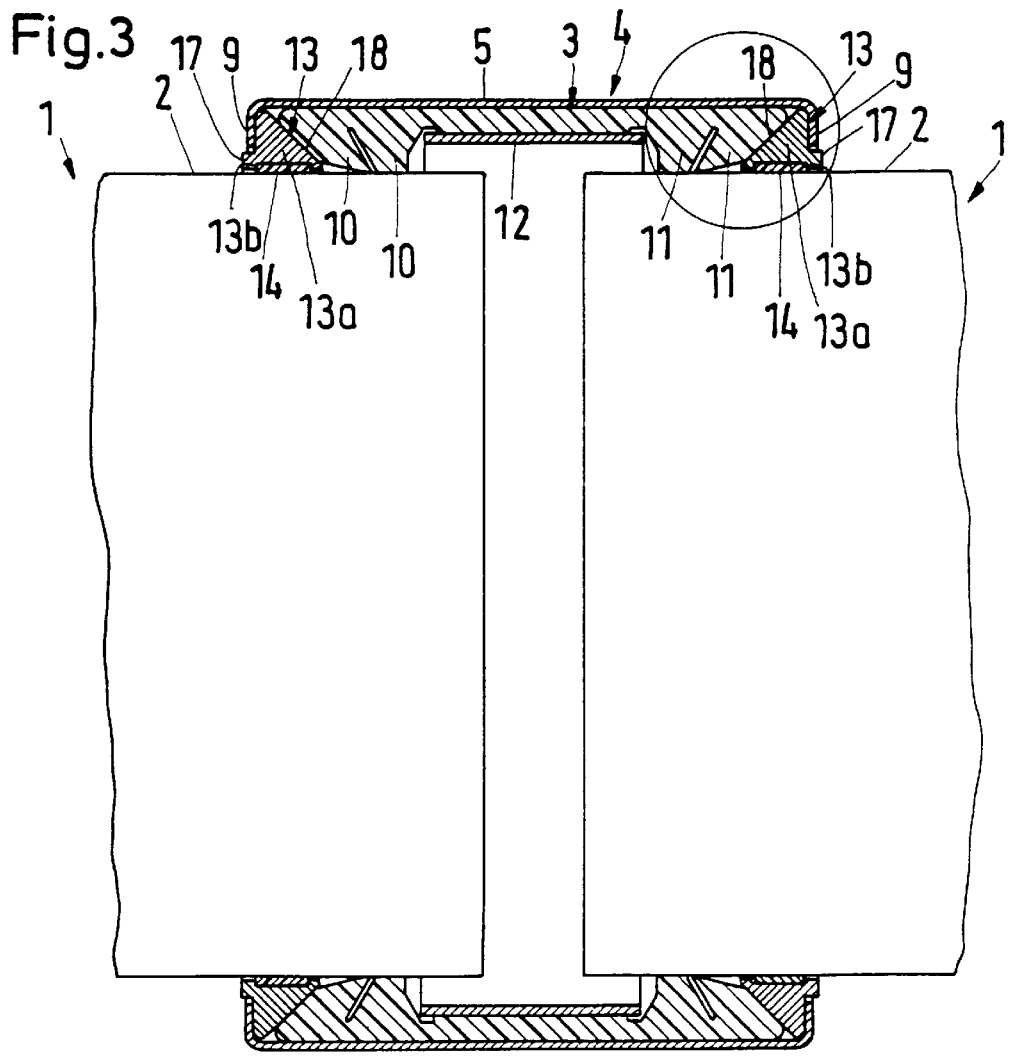
FIG. 3 is an axial sectional view of the pipe coupling of FIG. 1, with pipe ends introduced into the pipe coupling.
Figure 4:
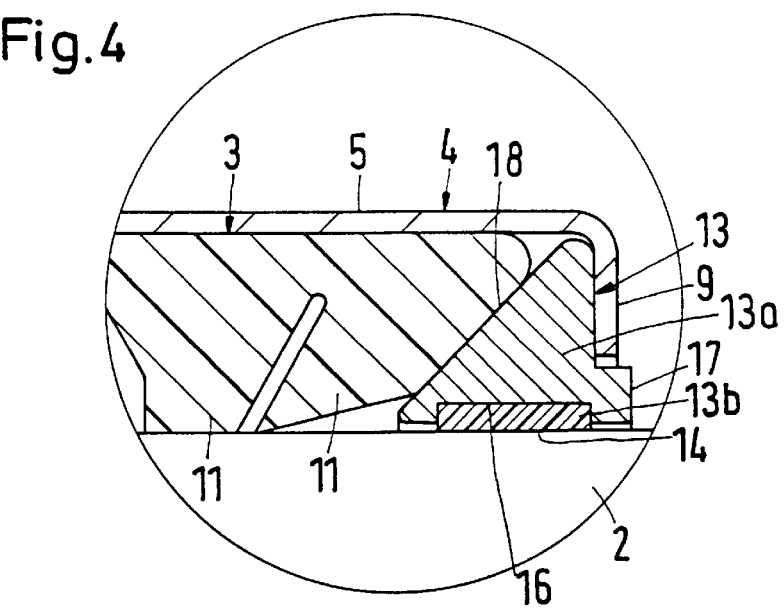
FIG. 4 is an enlarged detail of the circled area of FIG. 3.

Referring now to FIGS. 1–6, a pipe coupling, for connecting pipes 1 having substantially smooth, unprofiled end sections 2, according to the present invention is illustrated. Pipes 1 may be, for example, waste water pipes, which are made from a plastic material.

The pipe coupling includes a clamping clip 4 and an elastomeric sealing gasket 3. Sealing gasket 3 holds the pipe end sections 2 in a sealed manner. Clamping clip 4, which surrounds sealing gasket 3, has a clip strap 5, which is split in the circumferential direction, thereby forming an incomplete ring. In accordance with FIG. 1, the gap between the ends of the clip strap 5 is bridged by a bridge 19. The ends of the clip strap are bent radially outwardly and back to form clamping jaws 6. Bolts 7 pass axially through clamping jaws 6. Clamping jaws 6 can be drawn together in the circumferential direction by means of a tensioning device 8, in the form of tensioning bolts, which pass through radially continuous bores in one bolt 7 and radial threaded bores in the other bolt 7. Clip strap 5 has, on each axial end, flanges 9 that are bent radially inwardly.

The axial ends of sealing gasket 3 form sealing lips 10, 11, that are directed radially inwardly toward the pipe ends. A C-shaped metal strip 12 is located between sealing lips 10, 11. Metal strip 12 provides radial support for the sealing gasket 3 in the area of the joint between the mutually facing ends of the end sections 2 of pipes 1.

A C-shaped clamping ring 13, which is supported on the inner side of clip strap 5, is disposed on each axial side of sealing gasket 3. Clamping ring 13 is made substantially from plastic. Clamping ring 13 is located between sealing gasket 3 and flanges 9 of clip strap 5 (see, for example, FIGS. 3 and 4). Clamping ring 13 includes a radially outer ring part 13a and a radially inner ring part 13b. When clip strap 4 is tensioned, inner ring part 13b engages in the pipe material by means of minute projections (not shown) on radially inner face 14 of inner ring part 13b. The projections are formed by a predetermined, uniform roughness of the radially inner face 14 of clamping ring 13, preferably by emery.

In the illustrated exemplary embodiment, the minute projections are formed by the roughness of a friction lining that forms ring part 13b, which is attached to the radially inner circumference of ring part 13a.

Each ring part 13b, which is designed as a friction lining, is attached in a groove 16 in the radially inner circumference of the respective ring part 13a. The depth of groove 16 is less than the thickness of ring part 13b.

Clamping rings 13 are approximately triangular in cross-section. Likewise, the annular spaces between sealing gasket 3 and flanges 9 are approximately triangular in cross-section. Thus, clamping ring 13 approximately completely fills the annular space between sealing gasket 3 and flanges 9. An axial bead 17 of each clamping ring 13 engages in a gap between flange 9 and the outer circumference of pipe end section 2.

Figure 5:
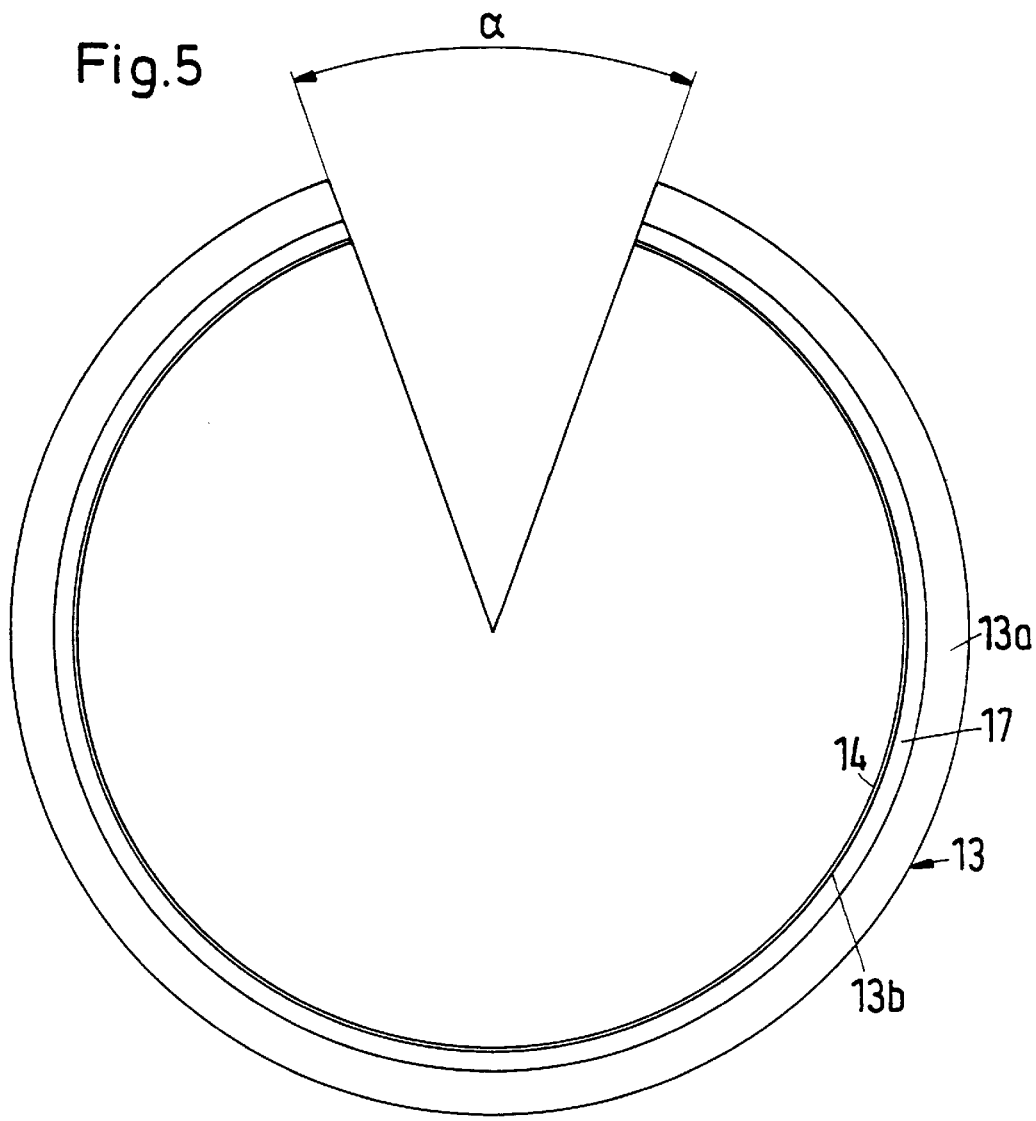
FIG. 5 is an axial view of a clamping ring.

In accordance with FIG. 5, the free ends of each clamping ring 13 are at an angle distance α, which ranges from approximately 20° to approximately 45°, preferably from approximately 30° to approximately 40°, and most preferably is approximately 35°.

Figure 6:
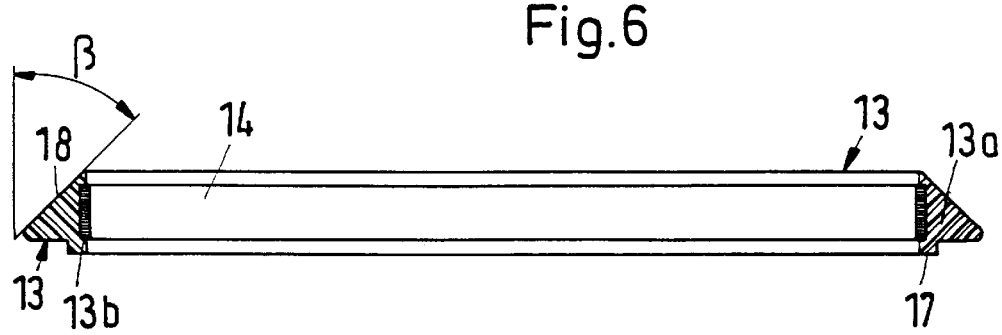
FIG. 6 is an axial sectional view of the clamping ring of FIG. 5.
Figure 7:
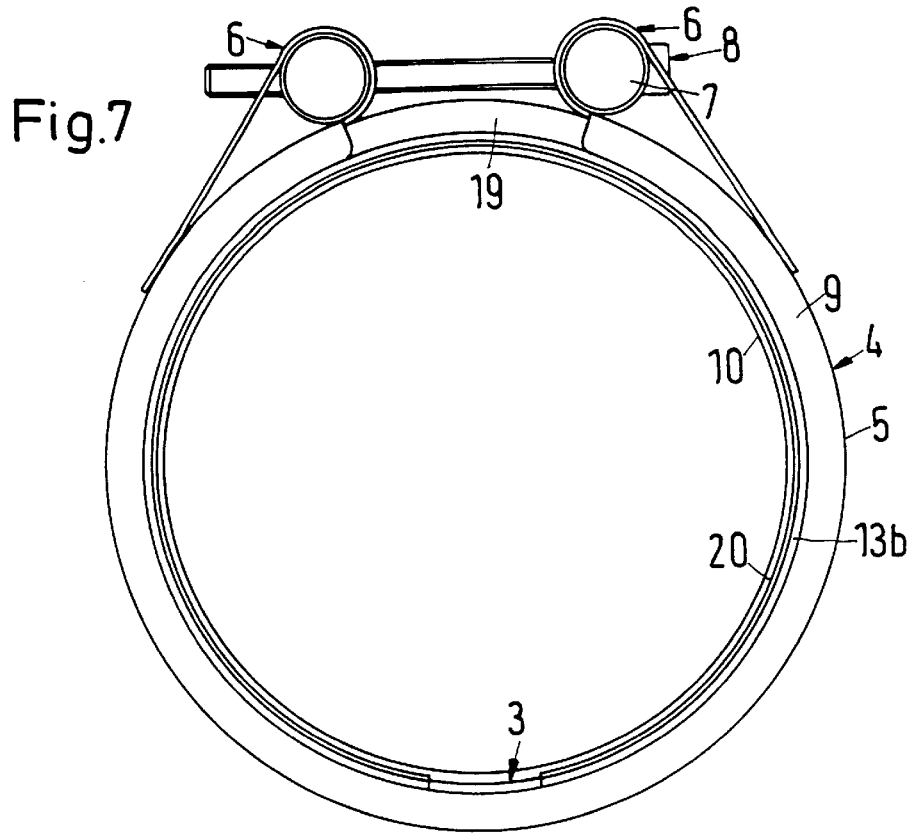
FIG. 7 is an axial end view of a second exemplary embodiment of a pipe coupling according to the present invention.
Figure 8:
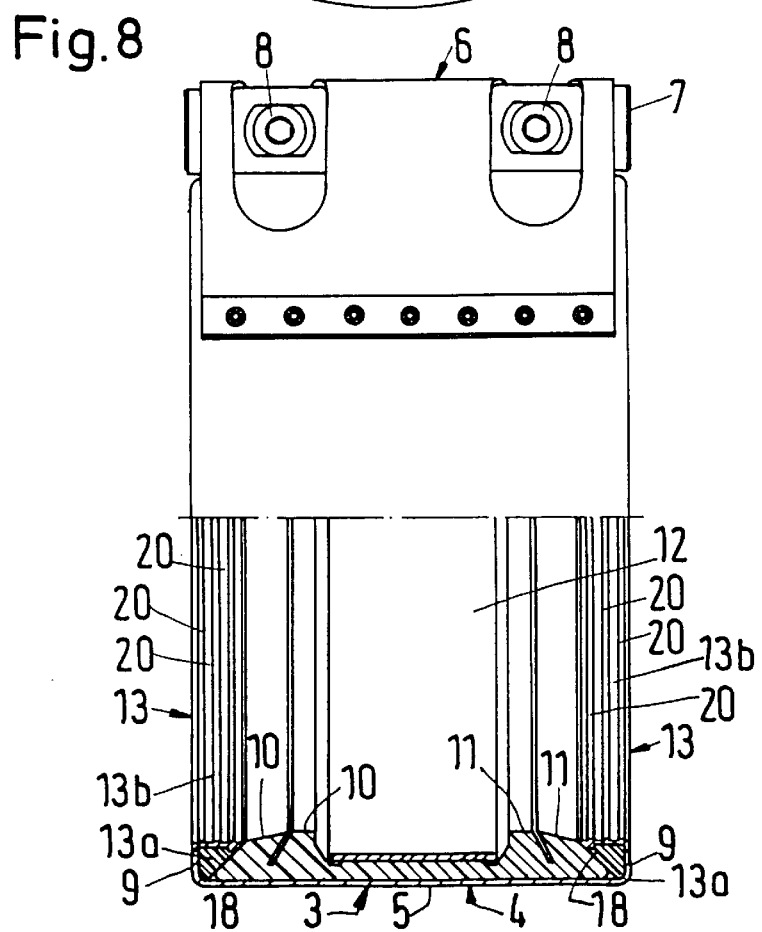
FIG. 8 is a front view, partially shown in cross-section, of the pipe coupling of FIG. 7.
Figure 9:
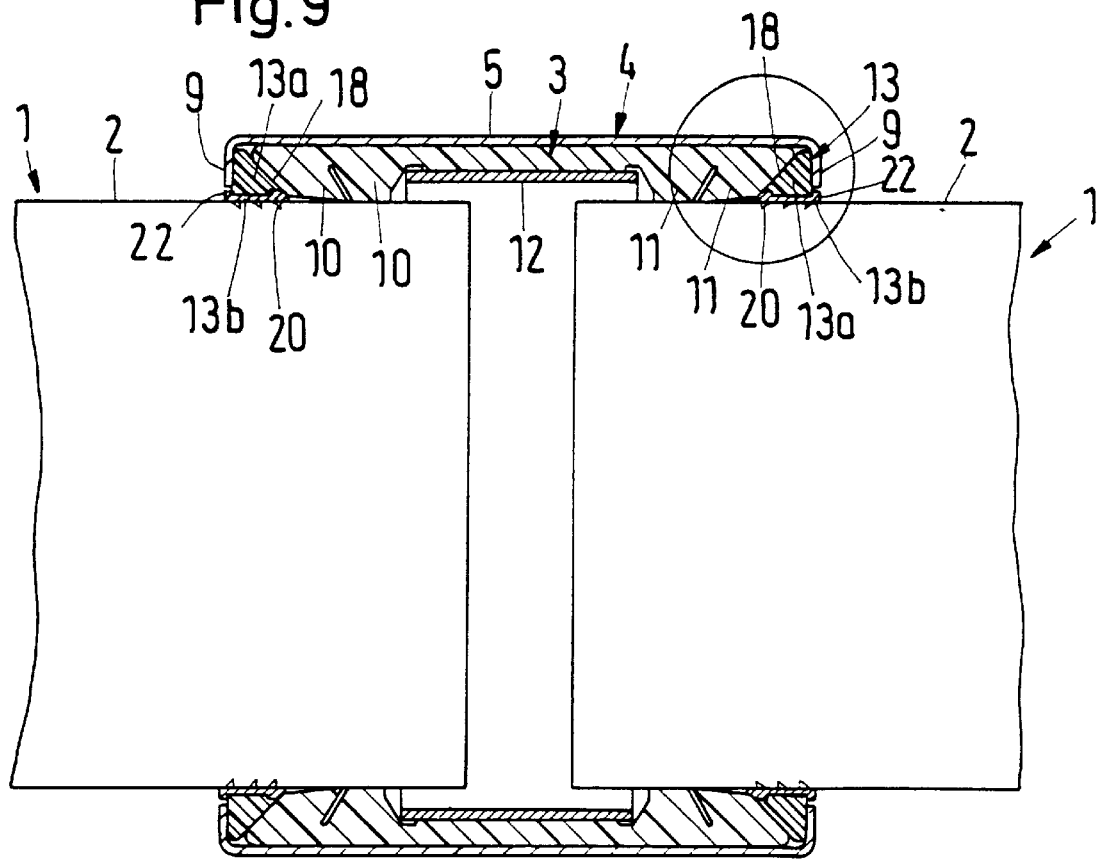
FIG. 9 is an axial sectional view of the pipe coupling of FIG. 7, with pipe ends introduced into the pipe coupling.
Figure 10:
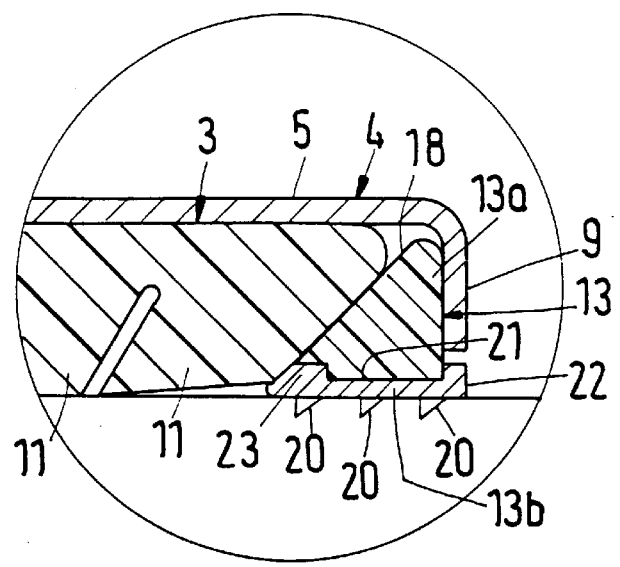
FIG. 10 is an enlarged detail of the circled area of FIG. 9.
Figure 11:
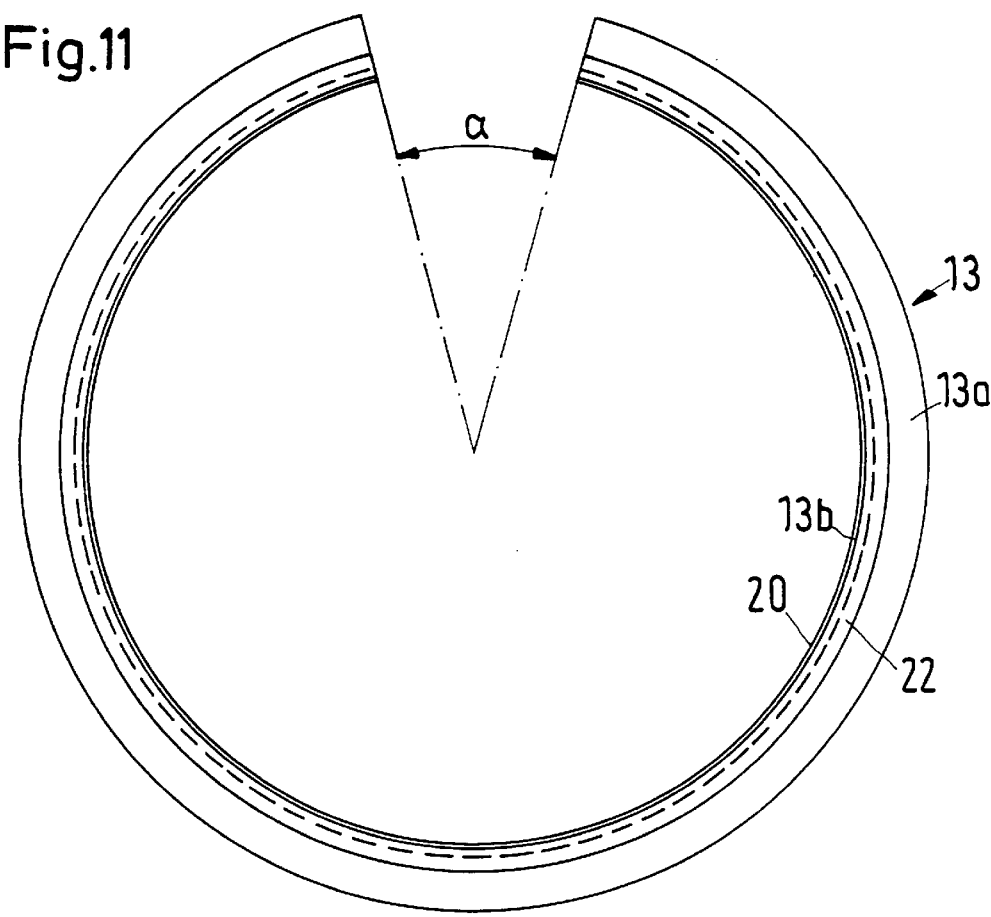
FIG. 11 is an axial view of the clamping ring of the second embodiment.
Figure 12:
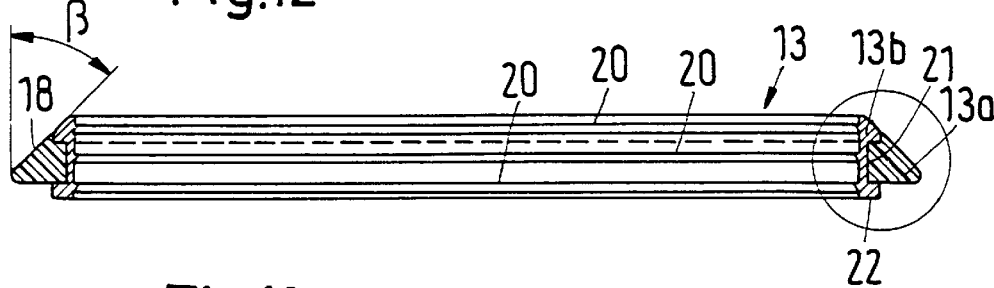
FIG. 12 is an axial sectional view of the clamping ring of FIG. 11.
Figure 13:
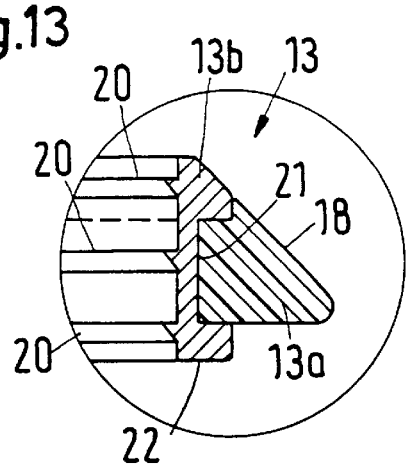
FIG. 13 is an enlarged detail of the circled area of FIG. 12.

In accordance with FIG. 6, the angle β, which is included by that face 18 of each clamping ring 13 that bears against the sealing gasket 3 and the longitudinal axis of the clamping ring ranges from approximately 35° to approximately 60°, and preferably is approximately 45°.

To a considerable extent, the rough face 14 of each clamping ring 13 bears on the corresponding pipe end section 2 over a relatively large area and, since it has only minute projections, prevents relatively deep grooves from being formed in the outer surface of the corresponding pipe 1 when the pipes 1 are moved apart in the axial direction as a result of very high internal pressures. This is advantageous in particular in the case of plastic pipes, but also for ceramic, glass or metal pipes, to prevent their strength (e.g., their bursting strength) from being reduced. Furthermore, because no deep grooves are formed in the pipe ends, there are no sharp-edge burrs formed therein that may damage the sealing faces (i.e., sealing lips 10, 11 of sealing gasket 3), when pipes 1 are uncoupled and are later reintroduced axially into the same pipe coupling.

Ring parts 13b may be adhesively bonded in groove 16 of ring parts 13a. Alternatively, however, ring parts 13b may be held in grooves 16 simply in a formfitting manner. In this case, they may additionally be secured by being inherently elastic in the radially outward direction. But it is also possible to form the friction faces 14 directly in the inner circumferential face of clamping rings 13 (e.g., by embedding emery in these circumferential faces) if clamping rings 13 are made of plastic. Face 14 of ring parts 13b, which are formed as friction linings, may also be formed with emery, in which case the friction linings, may also be made of plastic.

As an alternative, ring parts 13b, which are formed as friction linings, may be made of metal. The fine projections on face 14 may be pressed out, from the outside inward, in the form of flakes, next to radially continuous incisions in the friction linings.

Referring now to FIGS. 7–13, a second exemplary embodiment in accordance with the present invention is illustrated. The second embodiment differs from the first exemplary embodiment only in the way in which clamping rings 13 are designed. Clamping rings 13 comprise a radially outer ring part 13a and a radially inner ring part 13b. Ring part 13a is substantially made of plastic, and ring part 13b is substantially made of metal. A plurality of parallel ribs 20 extend over the inner circumference of ring part 13b. In the illustrated exemplary embodiment, three ribs 20 extend over the inner circumference of ring part 13b. Ribs 20 taper radially inwardly. Each of the ribs 20 have a right-angled triangle shape in cross-section. A side of each rib 20 that forms one of the shorter sides faces toward the axial center of the pipe coupling, and the side that forms the hypotenuse faces away from the axial center of the pipe coupling. On its radial outer side, each ring part 13b has an encircling groove 21, in which the radially outer ring part 13a is attached, preferably by adhesive bonding. The axially outer wall 22 of each ring part 13b lies in a gap between one of the flanges 9 and the pipe circumference. The axially inner wall 23 engages in an undercut of the outer ring part 13a (see FIG. 10). The axially inner face of ring part 13b is flush with face 18 of ring part 13a (see FIGS. 10 and 12). Face 18 of ring 13 bears against the sealing gasket 3 and is inclined at angle β with respect to the longitudinal axis (see FIG. 12). Angles α and β are the same as in the first exemplary embodiment (see FIGS. 11 and 12).

Radially outer ring part 13a is substantially made entirely of plastic. Outer ring part 13a is preferably made of glass-fiber-reinforced polyamide, (e.g., PA 66), in which "short" glass fibers are embedded. In the finished injection-molded ring part 13a, the glass fibers preferably have a length of from 0.1 to 0.8 mm. The glass fibers form approximately 25 to 30% of ring part 13a by volume.

The radially inner ring part 13b is substantially made of brass, with a small addition of manganese. Ring part 13a preferably contains approximately 57 to 59% Cu (all percentages are by weight); 1.5 to 3.0% Mn.; 1.3 to 2.3% Al; 0.2 to 0.8% Pb; and 0.3 to 1.3% Si, and the remainder consists of zinc (Zn) and impurities of at most 0.4% Sn, 1.0% Fe, 1.0% Ni and further impurities of at most 0.3%.

This alloy is relatively hard, but is nevertheless easy to mold by extrusion and to bend into a ring shape. This alloy also has a certain elasticity. In addition, the ribs 20 can easily be rolled into the extrudate when it is still straight (i.e., before it is bent into the ring shape).

Figure 14:
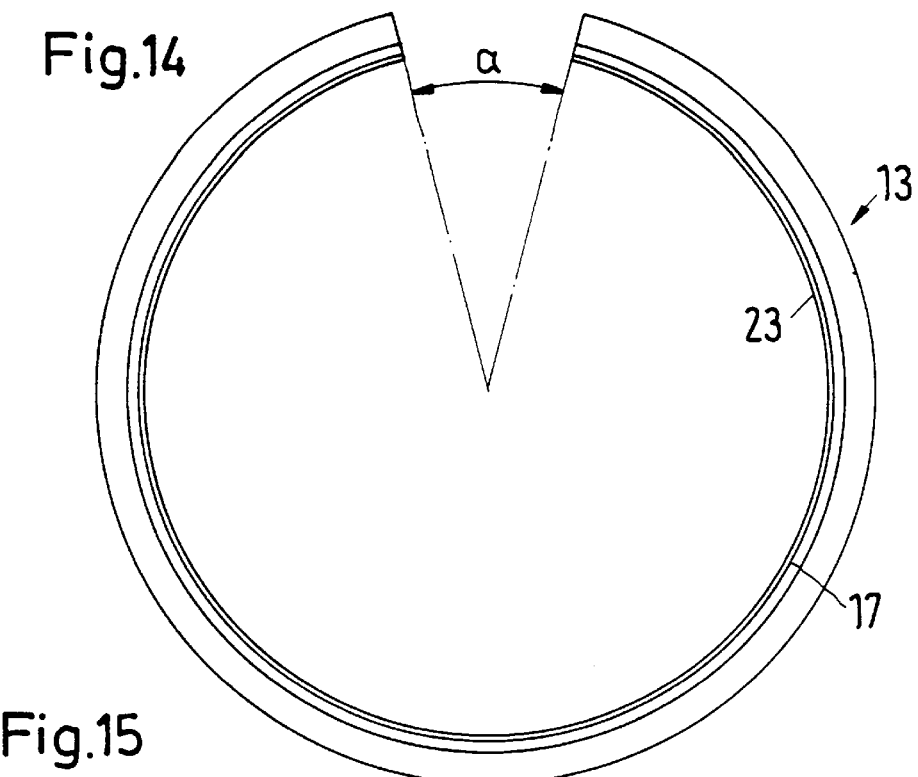
FIG. 14 is an axial view of a modified clamping ring that may be used with the pipe coupling of FIGS. 7–10.
Figure 15:
FIG. 15 is an axial sectional view of the clamping ring of FIG. 14.
Figure 16:
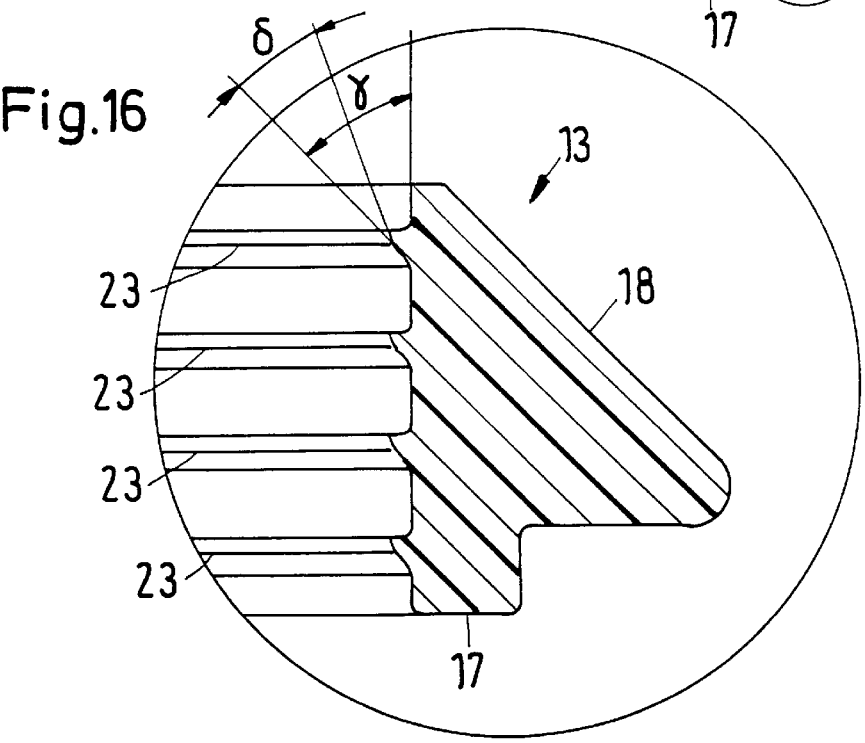
FIG. 16 is an enlarged detail of the circled area of FIG. 15.

Referring now to FIGS. 14–16, another embodiment of clamping ring 13 is illustrated, in which the ring is made from a single plastic part. Clamping ring 13 has a plurality of ribs 23 that extend over its inner circumference and taper radially inward. Like the cross section of ribs 20, the cross section of ribs 23 is substantially in the form of a right-angled triangle. The hypotenuse of the right-angled triangle faces away from the axial center of the pipe coupling. The hypotenuse section of ribs 20, includes an angle γ of slightly less than 45°, preferably approximately 41°, with respect to the axial direction of the pipe coupling. The radially inner edge of ribs 23 is flattened off by an angle δ of approximately 20° to approximately 25° with respect to the hypotenuse section. This flattening allows higher axial loads to be applied to ribs 23.

Angles α and β are, once again, the same as those given in the first exemplary embodiment.

Holding rings 13 are preferably made of a glass-fiber-reinforced polyamide, preferably PA 66, with a "long" glass fiber content of approximately 50 to 80% by volume, preferably approximately 60% by volume. In the starting state, the length of the long glass fibers is approximately 5 to 10 mm. In the state in which the long glass fibers are embedded in the polyamide, the length is only about 1 to 8 mm, because at least most of the fibers break up when the plastic clamping rings are injection molded. In the modified form of the clamping rings 13 in accordance with FIGS. 14–16, the higher glass fiber content of the clamping rings 13 causes rings 13 to have a higher strength than the ring parts 13a in the previous exemplary embodiments. Additionally, a single-piece design can be produced more easily than a two-part design.

Both with a single-piece design and when each clamping ring 13 is designed with an inner friction lining or ring part 13a attached thereto, there is no need to separately assemble two different parts of the clamping ring in the clamping clip.

Having described presently preferred exemplary embodiments of a pipe coupling in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A pipe coupling for connecting pipes having unprofiled end sections, said pipe coupling comprising:

an elastomeric sealing gasket for holding the unprofiled pipe end sections in a sealed manner;

a clamping clip surrounding said sealing gasket, said clamping clip having a clip strap having a first end and a second end, a first clamping jaw formed at said first end, a second clamping jaw formed at said second end, said clamping jaws being drawn together by a tensioning device, said clip strap having radially inwardly directed projecting flanges on each of its axial ends; and a first C-shaped clamping ring and a second C-shaped clamping ring, each being disposed between said sealing gasket and one of said flanges, each of said C-shaped clamping rings being supported on a radially inner side of said clip strap, each of said C-shaped clamping rings having projections projecting from its radially inner face and, when said clip strap is tensioned, said projections of said C-shaped clamping rings engaging in the pipe material;

wherein, each of said C-shaped clamping rings is made of, at least in part, plastic, each of said C-shaped clamping rings comprising a first ring part and a second ring part, said second ring part being attached to the radially inner circumference of said first ring part, each of said C-shaped clamping rings being approximately triangular in cross section so that they approximately fill the space between said sealing gasket and said one of said flanges.

2. The pipe coupling as claimed in claim 1, wherein said projections are formed by a predetermined, uniform roughness of the radially inner face of said clamping rings.

3. The pipe coupling as claimed in claim 2, wherein said second ring part is a friction lining, said friction lining containing the roughness.

4. The pipe coupling as claimed in claim 3, wherein said second ring part is attached in a groove in the radially inner circumference of said first ring part, wherein a depth of said groove is less than a radial thickness of said second ring part.

5. The pipe coupling as claimed in claim 2, wherein the roughness is emery.

6. The pipe coupling as claimed in claim 3, wherein said projections are pressed out, from the radial outside inward, in the form of flakes, next to radially continuous incisions in the friction linings.

7. The pipe coupling as claimed in claim 6, wherein said friction linings are made of metal.

8. The pipe coupling as claimed in claim 1, wherein said first ring part is substantially made of plastic, said second ring part is substantially made of metal, and wherein said projections are ribs that extend over the inner circumference of said second ring part, said ribs taper radially inwardly.

9. The pipe coupling as claimed in claim 8, wherein said first ring part is attached in a groove in the radially outer circumference of said second ring part, wherein a depth of said groove is less than a radial thickness of said first ring part.

10. The pipe coupling as claimed in claim 8, wherein said first ring part is made of a polyamide that is reinforced with glass fibers.

11. The pipe coupling as claimed in claim 9, wherein said first ring part is made of a polyamide that is reinforced with glass fibers.

12. The pipe coupling as claimed in claim 10, wherein the polyamide is PA 66.

13. The pipe coupling as claimed in claim 11, wherein the polyamide is PA 66.

14. The pipe coupling as claimed in claim 8, wherein said second ring part is made substantially of brass.

15. The pipe coupling as claimed in claim 14, wherein said second ring part additionally contains manganese.

16. A pipe coupling for connecting pipes having unprofiled end sections, said pipe coupling comprising:

an elastomeric sealing gasket for holding the unprofiled pipe end sections in a sealed manner;

a clamping clip surrounding said sealing gasket, said clamping clip having a clip strap having a first end and a second end, a first clamping jaw formed at said first end, a second clamping jaw formed at said second end, said clamping jaws being drawn together by a tensioning device, said clip strap having radially inwardly directed projecting flanges on each of its axial ends; and a first C-shaped clamping ring and a second C-shaped clamping ring each being disposed between said sealing gasket and one of said flanges, each of said C-shaped clamping rings being supported on a radially inner side of said clip strap, each of said C-shaped clamping rings having projections projecting from its radially inner face and, when said clip strap is tensioned, said projections of said C-shaped rings engaging in the pipe material;

wherein, each of said C-shaped clamping rings is made substantially of plastic, each of said C-shaped clamping rings being approximately triangular in cross section so that they approximately fill the space between said sealing gasket and said one of said flanges, and said projections are ribs that extend over the inner circumference of each of said clamping rings, said ribs tapering radially inwardly.

17. The pipe coupling as claimed in claim 16, wherein said clamping rings are made of a polyamide that is reinforced with glass fibers.

18. The pipe coupling as claimed in claim 17, wherein the polyamide is PA 66.

* * * * *